United States Patent Office 3,030,213
Patented Apr. 17, 1962

3,030,213
DRY ACIDULENTS
William Albert Tidridge, Fanwood, and Raimond Pals, Farmingdale, N.J., assignors to FMC Corporation, a corporation of Delaware
No Drawing. Filed May 23, 1960, Ser. No. 31,226
6 Claims. (Cl. 99—129)

This invention relates to acidulents for food products, and more particularly to acidulent compositions which can be prepared in dry, free-flowing form and which are useful in the preparation of soft drink powders, gelatine dessert powders, and the like.

Organic food acids such as citric, tartaric, adipic, fumaric and lactic acids are commonly used as the acidulating ingredient of edible compositions to provide a desirable acid taste or tang. These organic acids are, however, relatively expensive. Phosphoric acid and acid phosphate salts such as monosodium orthophosphate, monocalcium orthophosphate, and sodium acid pyrophosphate are also used as acidulent ingredients of food products. Liquid phosphoric acid, for example, has been used as an acidulent in some food products and beverages thus providing the desired acid taste or tang at lower costs.

Historically, phosphates and phosphoric acid have been considered uniquely suited to application in foodstuffs. This has been by reason of their characteristic and favorable taste when compared with other strong mineral acids and their salts. However, liquid phosphoric acid cannot be incorporated into dry powdered formulations as readily as can the solid organic acids. Dry, solid acidulents containing phosphoric acid have not been successful because a large amount of a solid, dry carrier has been required in such mixtures in order that a dry, free-flowing product might be provided. If a sufficient quantity of such an acidulent composition were to be added to the food product to provide the desired acidity, the resulting large amount of solid carrier would present problems in taste, appearance or feel of the food produced. On the other hand, increasing the amount of phosphoric acid relative to the amount of the carrier provides a desirable acid taste or tang, but causes the mix of acid and carrier to be too wet, and therefore to cake excessively.

It is a feature of this invention to provide a low cost, dry acidulent having high acidity which can be used in food and beverage powder formulations to replace a substantial part of the organic acids normally used therein, and which will impart to such formulations a taste of the same kind as is imparted to the formulations by organic food acids alone.

It is a further feature of this invention to provide such acidulent compositions as dry, free-flowing powders which can be packaged and stored for long periods without caking.

These features can be accomplished by replacing up to about ⅓ to ½ of the organic food acids in common food or beverage powder formulations with a dry acidulent comprising a solid acid salt of phosphoric acid, phosphoric acid, and sulfuric acid. Surprisingly, the taste of a food product containing these acids is pleasant despite the fact that a strongly-acting acid, namely sulfuric acid, having a generally characteristic bitter and unsuitable taste, is present. In some cases, the sulfuric acid even has been found to improve the taste of the food or the beverage.

The dry acidulent of the present invention comprises an intimate mixture of a solid acid salt of phosphoric acid, phosphoric acid and concentrated sulfuric acid. The solid salt content of the mixture is about 76 to 95%, and preferably in the range of 85 to 95%. The phosphoric acid is present in the amount of about 3.5 to 22%, and preferably about 4 to 12%, and the sulfuric acid is present in the amount of about 0.1 to 2%, and preferably about 1 to 1.8%. This amount of sulfuric acid serves as effectively in the solution as does about 10 to 20% of phosphoric acid, and yet imparts no objectionable taste to the system. This makes it possible for the first time to obtain an acidity and taste which is desired with mineral acids, without having a caking system, even though as much as about 6% of the final dry acidulent mixture is water.

Mixtures of the solid acid phosphate salts with more than about 22% of phosphoric acid are moist and sticky, and cannot be dried or aged to form a free-flowing product which will not cake in storage. Although dry, free-flowing products containing less than about 3.5% of phosphoric acid can be prepared, these compositions have insufficient acidity to impart the desired acid taste or tang to the finished solid food product or beverage. The phosphoric acid normally is introduced as 85% phosphoric acid in water, although more concentrated acid may be employed where it is available. Use of less concentrated acid makes it necessary to remove unduly large amounts of water from the formulation to obtain a dry product.

About 30 to 50% of the phosphoric acid normally required in acidulents can be replaced by the sulfuric acid, and only about 10% by weight as much sulfuric acid as replaced phosphoric acid is needed to provide the equivalent acidity and taste. While a still more acid, and at the same time dry, composition can be made by replacing more than 50% of the normally used phosphoric acid with sulfuric acid, such compositions are not satisfactory for some uses because of the unpleasant taste that large amounts of sulfuric acid give to the finished product. We have found that the acid phosphate composition preferably should not contain more than about 2% of 97% sulfuric acid.

In the final product, a desirable taste is imparted to the dessert or beverage when the acidulents of the present invention are used in amounts which result in the introduction into the final product of a low sulfuric acid concentration, on the order of no more than about 100 parts per million in the finished dessert or drink. For many food products, about ¼% to 5% of the acidulent, as percent of total food powder, will be employed along with the organic food acid. The particular amount of total acidulent employed will vary in well-known fashion with the food product being prepared.

Strong acids other than sulfuric acid, such as hydrochloric acid and nitric acid, are not satisfactory as replacements for phosphoric acid in acidulents because undesirable large amounts of these acids are required to provide proper acidity, and, as would be expected, they impart an unfavorable taste and odor to food products containing them.

As the solid acid phosphate salt carriers for the phosphoric and sulfuric acids, it is preferred to use monosodium orthophosphate, monopotassium orthophosphate, monocalcium orthophosphate, or mixtures of these salts. However, other soluble phosphate salts such as disodium dihydrogen pyrophosphate can be used, although only small amounts of the latter should be used, usually in conjunction with orthophosphates, because the pyrophosphates impart a peculiarly bitter aftertaste to food products if used in too large amounts. The phosphate may contain water of hydration, although not in excessive amounts.

The acidulent compositions of this invention are prepared by mixing the liquid concentrated acids with the finely-divided solid salts in any suitable acid-resistant mixing apparatus such as a paddle, ribbon or sigma-bladed mixer or a rotary tube mixer. Comminuters and tumbling-type intensifying blenders may also be used. We prefer to spray the liquid acids onto the agitated solid ingredients so that the liquid ingredients are uniformly distributed and adsorbed on the surfaces of the solid particles. We have found that a Paterson-Kelly Liquids-Solid Blender is a particularly effective apparatus for preparing the acidulent compositions.

The freshly mixed product is usually somewhat damp, and tends to set up and cake if packaged and stored immediately, especially when the ratio of liquid to solid ingredients is near the upper limit for making a dry product or when more dilute acids than 85% phosphoric and 97% sulfuric acid are used. It has been found that up to about 10% of the mixture prior to drying may be water, including water of hydration present in the phosphates, without dissolution and permanent caking of the mixture. If much more than 10% of the initial mix is water, drying of the mix results in the formation of large aggregates which must be ground to provide a free-flowing, readily-soluble powder. This, of course, can be done is desired, although it is not normally economically practical.

In any case, it is usually desirable to dry and age the mixed acidulent before storage or use. Drying for a few hours at a temperature around 100° C. is ordinarily sufficient, although the drying conditions required will vary somewhat with the composition of the acidulent. Drying preferably will be carried to the point where the total water content of the mix is about 2 to 6% or even less, in order to avoid caking. If desired, the finished acidulent may be blended with one or more of the other ingredients of the dessert or beverage powder such as sugar or citric acid and stored for long periods of time without serious caking. In this case, it sometimes is unnecessary to dry the damp, freshly-mixed acidulent, as water present in it will be removed by the other ingredients.

In some cases, the preparation of the acidulent may be speeded up and improved by subjecting the fresh acidulent mixture to briquetting pressures of 1500 pounds per square inch or more. The drying and aging time for compositions which tend to be somewhat moist and sticky when first mixed is substantially reduced by the briquetting procedure. The briquettes may be ground and blended with other ingredients within a few hours or they may be conveniently stored or shipped in this form for use at other locations. It is believed that the briquetting process causes the liquid acids to spread quickly throughout the mass of solid particles so that all of the available surface is immediately used to adsorb the liquid, and a dry product is obtained with a minimum of mixing, drying and aging time.

It will be apparent that the ingredients of the present dry acidulents may be incorporated directly into the food or beverage to be acidified, without being combined before use in a dry composition. In this case the sulfuric acid employed in the acidulent may be replaced with an acid sulfate such as sodium acid sulfate, calcium acid sulfate or the like. Use of these acid sulfates rather than sulfuric acid in the dry acidulents is not desirable, however, as they are hygroscopic and thus tend to attract water and promote caking in the acidulent.

The following examples of the present dry acidulent compositions and their use are given by way of illustration only, and are not intended to limit the scope of the present invention.

EXAMPLES 1 TO 12
*Preparation of Dry Acidulents*

The dry acidulent compositions reported as Examples 1 to 12 in Table I which follows, were prepared by spraying the liquid ingredients onto the salt while the latter was being mixed in a high speed comminuter mixer. The sulfuric acid was introduced as 97% sulfuric acid, and the phosphoric acid used as 85% material. The resulting compositions were dried for three hours at 100° C. in an oven, cooled to room temperature, and run through a hammer mill. The products remained free-flowing, even after several weeks storage in containers.

TABLE I

| Example No. | $Ca(H_2PO_4)_2$ | $NaH_2PO_4$ | $Na_2H_2P_2O_7$ | $KH_2PO_4$ | Total Salts | $H_3PO_4$* | $H_2SO_4$* | Total Anhydrous | Initial $H_2O$ | Final $H_2O$ |
|---|---|---|---|---|---|---|---|---|---|---|
| 1 | 35.75 | 35.2 | | | 70.95 | 21.34 | 1.16 | 93.45 | 6.55 | 2.2 |
| 2 | | 77.7 | | | 77.7 | 17.43 | 1.75 | 96.88 | 3.12 | 1.52 |
| 3 | | 73.2 | | | 73.2 | 21.76 | 1.16 | 96.12 | 3.88 | 1.84 |
| 4 | 17.83 | 54.6 | | | 72.43 | 21.25 | 1.16 | 94.84 | 5.16 | 1.8 |
| 5 | 21.36 | 71.3 | | | 92.66 | 3.91 | 1.07 | 97.64 | 2.36 | 0.4 |
| 6 | 19.22 | 70.0 | | | 89.22 | 6.80 | 1.26 | 97.28 | 2.72 | 0.64 |
| 7 | | 95.1 | | | 95.1 | 3.57 | 0.68 | 99.35 | 0.65 | 0.32 |
| 8 | | 90.7 | | | 90.7 | 6.80 | 1.26 | 98.76 | 1.24 | 0.66 |
| 9 | | 75.7 | | | 75.7 | 20.40 | 0.29 | 96.39 | 3.61 | 1.68 |
| 10 | 19.22 | | | 70.9 | 89.22 | 6.80 | 1.26 | 97.28 | 2.72 | 0.60 |
| 11 | 84.21 | | | | 84.21 | 6.80 | 1.26 | 92.27 | 7.73 | 0.72 |
| 12 | | | 57.7 | 25.0 | 77.7 | 17.50 | 1.82 | 96.32 | 3.52 | 1.79 |

*100 %Acid basis.

EXAMPLES 13 TO 34

*Use of the Acidulents in Food Products*

Standard gelatine dessert and beverage powders were prepared with typical amounts of common organic food acid acidulents, and the flavors of gelatines and beverages prepared with them were compared by a taste panel with the flavors of gelatines and beverages prepared from powders in which about ⅓ to ½ of the organic food acid had been replaced with the indicated dry acidulent from Table I. The added acidulent was used in the amount of about one to four times the amount of organic acid which it replaced.

The standard gelatine powder contained 85.5% of dextrose, 11.3% of gelatine, 2.8% of citric acid and 0.4% of flavorent. To prepare a gelatine, 84 grams of the powder were dissolved in 470 grams of water, and solution was refrigerated until it gelled. The standard beverage powder contained 91.8% of sucrose, 6.4% of flavorent, and 1.8% of citric acid. It was converted to a beverage by dissolving 60 grams of the powder in 530 grams of water.

Two aspects of flavor were considered in the present test. It was determined how the food flavor of a given gelatine or beverage compared with the standard using citric acid alone as the acid, and it was determined whether the acidulent employed as a replacement for the citric acid imparted any objectionable bitter or other taste to the product. Results of these tests are reported in Table II.

TABLE II

| Example No. | Acidulent | | | Powder | Flavor | |
|---|---|---|---|---|---|---|
| | Percent Citric Acid | Acidulent from Table I | Percent | | Fruit | Acidity |
| 13 | 2.8 | | | Gelatine | S | S |
| 14 | 1.8 | | | Beverage | S | S |
| 15 | 1.9 | 1 | 2.7 | Gelatine | S | S |
| 16 | 1.2 | 1 | 1.8 | Beverage | S | S |
| 17 | 1.4 | 2 | 2.8 | Gelatine | S | B |
| 18 | 1.0 | 2 | 2.0 | Beverage | S | S |
| 19 | 2.0 | 7 | 1.8 | Gelatine | B | B |
| 20 | 0.9 | 7 | 2.7 | Beverage | S | B |
| 21 | 1.4 | 9 | 3.0 | Gelatine | S | S |
| 22 | 1.0 | 9 | 1.6 | Beverage | S | B |
| 23 | 1.9 | 10 | 2.7 | Gelatine | S | S |
| 24 | 1.2 | 10 | 1.8 | Beverage | S | S |
| 25 | 1.4 | 11 | 4.2 | Gelatine | B | S |
| 26 | 1.9 | 11 | 2.7 | Beverage | S | S |
| | Percent Fumaric Acid | | | | | |
| 27 | 1.9 | | | Gelatine | S | S |
| 28 | 2.7 | | | Beverage | S | S |
| 29 | 1.3 | 1 | 0.6 | Gelatine | B | B |
| 30 | 1.8 | 3 | 0.9 | Beverage | B | B |
| | Percent Adipic Acid | | | | | |
| 31 | 2.8 | | | Gelatine | S | S |
| 32 | 2.7 | | | Beverage | S | S |
| 33 | 1.9 | 1 | 0.9 | Gelatine | B | B |
| 34 | 1.8 | 3 | 0.9 | Beverage | B | B |

S—Equivalent to Standard
B—Better than Standard.

It will be seen from these examples that acidulent compositions containing amounts of solid phosphate salts, phosphoric acid and sulfuric acid within the herein ranges can be prepared as dry, free-flowing powders which can be incorporated in typical beverage and gelatine dessert powdered food formulations. It has also been determined that compositions containing greater than the indicated upper limit of phosphoric acid cannot be dried readily to provide a noncaking mix, and that, on being stored for periods of time in the atmosphere, these compositions cake badly.

The present acidulent compositions are very useful to the food and drink industry. They make it possible to replace a substantial portion of the commonly used, but expensive, fruit-flavored organic food acids with relatively inexpensive inorganic powdered formulations, which for the first time can be provided in a dry, powdered form in which they do not either add a risk of caking to the food formulations, or result in the introduction of a bitter, undesirable flavor. It is of great advantage to the processor to be able to obtain a dry powdered product of this type which he can store indefinitely without fear of caking or other changes, and which he can employ with safety and with no sacrifice in the taste or other characteristics of his final product.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. Dry, free-flowing acidulent for food products, comprising in intimate admixture about 76 to 95% of a solid acid salt of phosphoric acid, about 3.5 to 22% of phosphoric acid and about 0.1 to 2% of sulfuric acid.

2. Acidulent of claim 1 in which the solid acid salt of phosphoric acid is monocalcium acid phosphate.

3. Acidulent of claim 1 in which the solid acid salt of phosphoric acid is monosodium acid phosphate.

4. Acidulent of claim 1 in which the solid acid salt of phosphoric acid is monopotassium acid phosphate.

5. Dry, free-flowing acidulent of food products, comprising an intimate admixture of about 85 to 95% of a solid acid salt of phosphoric acid, about 4 to 12% of phosphoric acid, and about 1 to 1.8% of sulfuric acid.

6. Dry, free-flowing powdered food product containing food ingredients and an acidulent of which about ½ to ⅔ is an is an organic food acid, and about ⅓ to ½ is a dry, free-flowing acidulent comprising about 76 to 95% of a solid acid salt of phosphoric acid, about 3.5 to 22% of phosphoric acid, and about 0.1 to 2% of sulfuric acid.

References Cited in the file of this patent

"Acids Play Important Roles in Flavor," by Sivetz, Food Industries, October 1949, pages 74 and 75.

"Uses and Applications of Chemicals and Related Materials," by Gregory, Reinhold Publishing Corp., 330 West Forty-second Street, New York, page 581.

UNITED STATES PATENT OFFICE
CERTIFICATE OF CORRECTION

Patent No. 3,030,213 April 17, 1962

William Albert Tidridge et al.

It is hereby certified that error appears in the above numbered patent requiring correction and that the said Letters Patent should read as corrected below.

Column 3, line 46, for "is" read -- if --; columns 3 and 4, TABLE I, under the heading "KH$_2$PO$_4$", for "70.9" read -- 70.0 --; column 6, line 55, strike out "is an", second occurrence.

Signed and sealed this 14th day of August 1962.

(SEAL)
Attest:

ERNEST W. SWIDER
Attesting Officer

DAVID L. LADD
Commissioner of Patents